United States Patent [19]
Satz et al.

[11] 3,806,612
[45] Apr. 23, 1974

[54] PROCESS FOR COATING SEAFOOD

[75] Inventors: Mark V. Satz, Bethel Park, Pa.; Lawrence A. Edwards, Brownsville, Tex.; Thomas Livsey, Mattapoisett, Mass.

[73] Assignee: Calgon Corporation, Pittsburgh, Pa.

[22] Filed: Nov. 24, 1972

[21] Appl. No.: 309,094

Related U.S. Application Data
[62] Division of Ser. No. 697,104, Jan. 11, 1968, abandoned.

[52] U.S. Cl......... 426/302, 118/1, 118/19, 118/56, 426/68, 426/271, 426/305, 426/310, 426/321, 426/376

[51] Int. Cl.............. A23b 3/14, A23l 3/34

[58] Field of Search........... 99/160, 159, 195, 166, 99/111, 158, 169; 118/18, 19, 22, 24, 418

[56] References Cited
UNITED STATES PATENTS

| | | | |
|---|---|---|---|
| 3,149,554 | 9/1964 | Greenspan | 99/159 |
| 7,766 | 11/1850 | Starkweather | 99/159 |
| 3,101,040 | 8/1963 | Lanz | 99/235 |
| 3,408,980 | 11/1968 | Benson | 118/19 |
| 3,123,498 | 3/1964 | Braak et al. | 118/19 |
| 3,102,052 | 8/1963 | Ackles | 118/19 |
| 1,819,557 | 8/1931 | Hunter | 118/19 |
| 3,165,416 | 1/1965 | Sleeth et al. | 99/169 |
| 2,467,989 | 4/1949 | Porch | 118/324 X |
| 2,761,420 | 9/1956 | Mottet | 118/63 X |
| 2,872,386 | 2/1959 | Aspegren | 259/3 X |
| 3,255,021 | 6/1966 | Earle | 99/158 |
| 3,408,980 | 11/1968 | Benson | 118/418 X |
| 3,427,951 | 2/1969 | Mitan | 99/195 |
| 3,703,382 | 11/1972 | Harkey | 99/169 |

*Primary Examiner*—Morris O. Wolk
*Assistant Examiner*—Sidney Marantz
*Attorney, Agent, or Firm*—Frank M. Mahon

[57] ABSTRACT

A method of treating seafood by applying a coating of treating agent and immediately thereafter flexing the same and an apparatus comprising a source of treating agent, means for spraying the same onto seafood to be treated and flexing means for flexing the sprayed seafood.

3 Claims, 5 Drawing Figures

INVENTORS
Mark V. Satz,
Lawrence A. Edwards &
Thomas Livsey

Fig. 3.
Fig. 4.
Fig. 5.
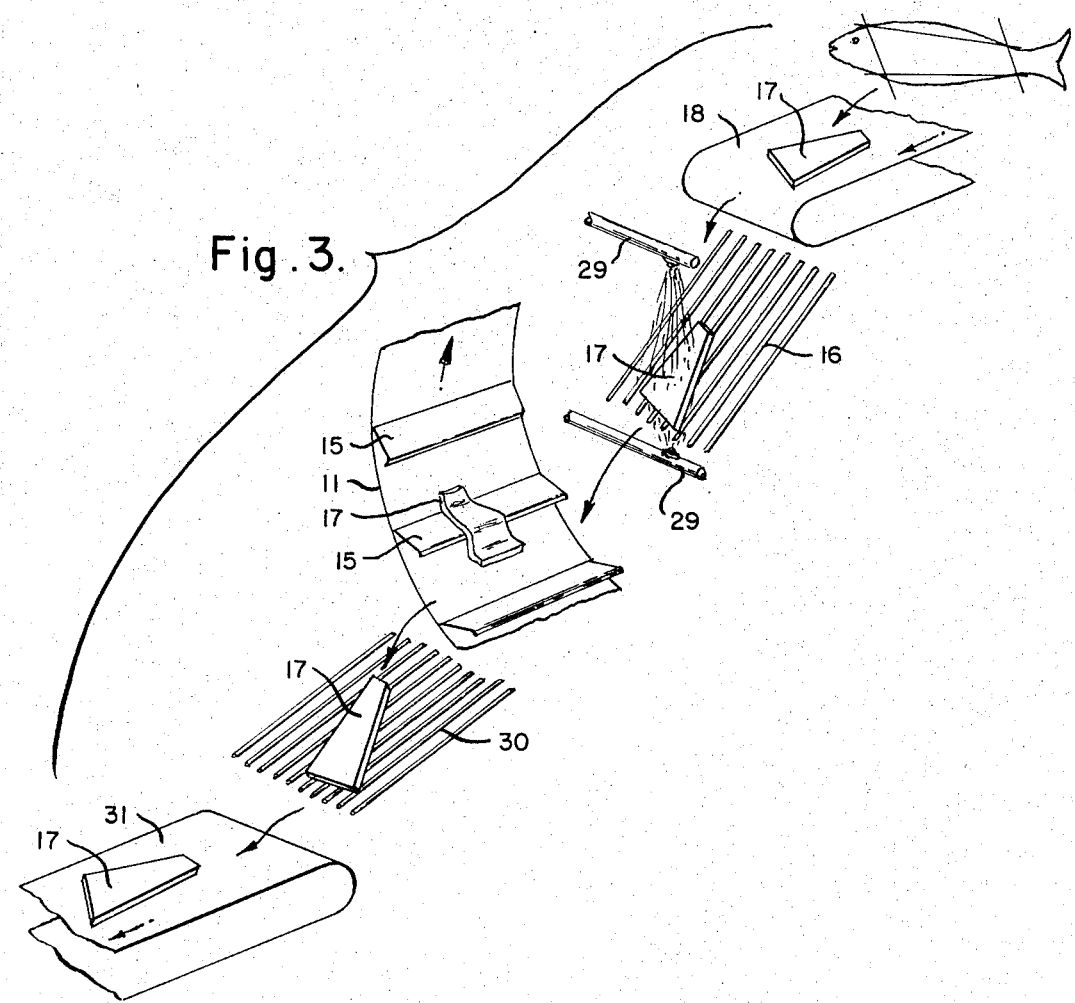
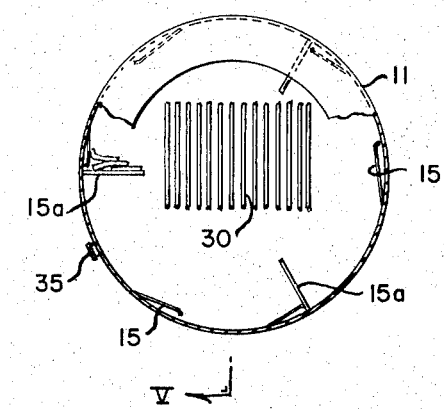
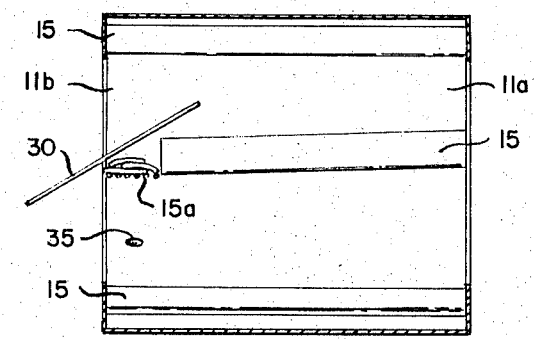
INVENTORS
Mark V. Satz,
Lawrence A. Edwards &
Thomas Livsey

PROCESS FOR COATING SEAFOOD

This application is a division of Ser. No. 697,104 filed Jan. 11, 1968, now abandoned.

This invention relates to seafood process and apparatus and particularly to a machine for automatically treating or processing seafood with liquid treating agents.

The practice of treating fish fillets and other seafood products with liquid treating agents is well known. For example, fish fillets and other seafood are treated with solutions of molecularly dehydrated phosphates prior to freezing to reduce the loss of soluble proteins as freezer drip on thawing. However, the actual mechanics of treatment have been relatively crude and wasteful. Generally the seafood has been soaked in or otherwise treated with a solution of treating agent either while stationary or on a conveyor. This results in large losses of treating chemicals and often times less than satisfactory treatment. Similarly, seafood is frequently treated with a brine solution during processing for market.

We have invented a seafood processing machine which eliminates the problems of treating agent waste and of incomplete or unsatisfactory treatment. We provide a machine which automatically treats seafood with a liquid treating agent with the minimum of losses and with the maximum of efficiency.

Preferably we provide a reservoir of treating agent, a rotatable drum mounted in a framework, means for rotating said drum, a plurality of spaced flexure members on the interior of said drum, a perforate infeed chute, such as a wire-rod chute, at one end of said drum receiving product to be treated and discharge the same into the interior of the drum, means for spraying treating agent at high pressure on opposite sides of said product on the infeed chute and an outfeed chute at the other end of said drum receiving treated product from said drum and delivering the same to a means for removing the product from the treating apparatus. Preferably the drum is provided with flexure members in the form of longitudinal baffles fixed to the interior of the drum. These baffles or any part of them, or the drum itself, may be inclined so as to assist in moving the product axially through the drum. Wire scoops are preferably provided adjacent the discharge end of the drum for collecting product and discharging it to the outfeed chute.

In the foregoing general description of the apparatus of our invention we have attempted to set out certain objects, purposes and advantages of the invention. Other objects, purposes and advantages will be apparent from the following description and the accompanying drawings in which:

FIG. 3 is a generally schematic illustration of the operational steps carried out in the machine of our invention;

FIG. 4 is an end elevation, partially cut away of the drum, of the apparatus of FIG. 1; and FIG. 5 is a section on the line V—V of FIG. 4.

Figure 1:
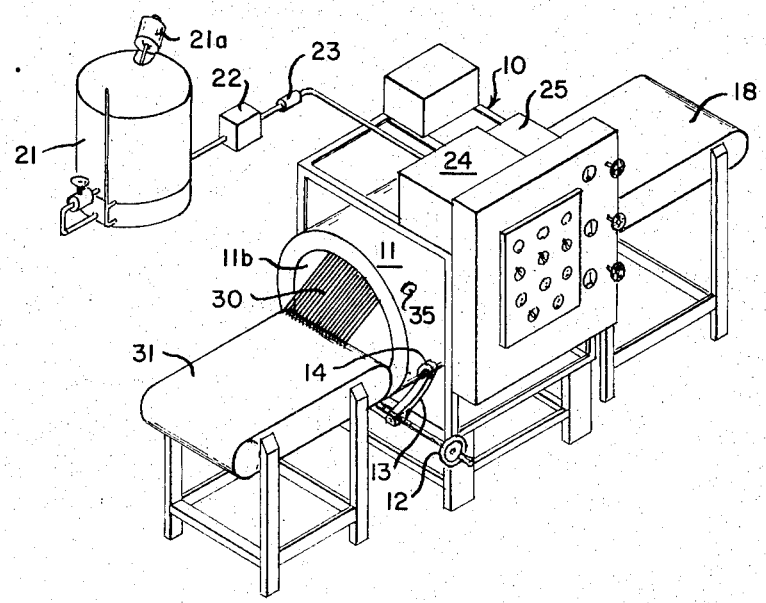
FIG. 1 is an isometric view of an apparatus according to our invention.
Figure 2:
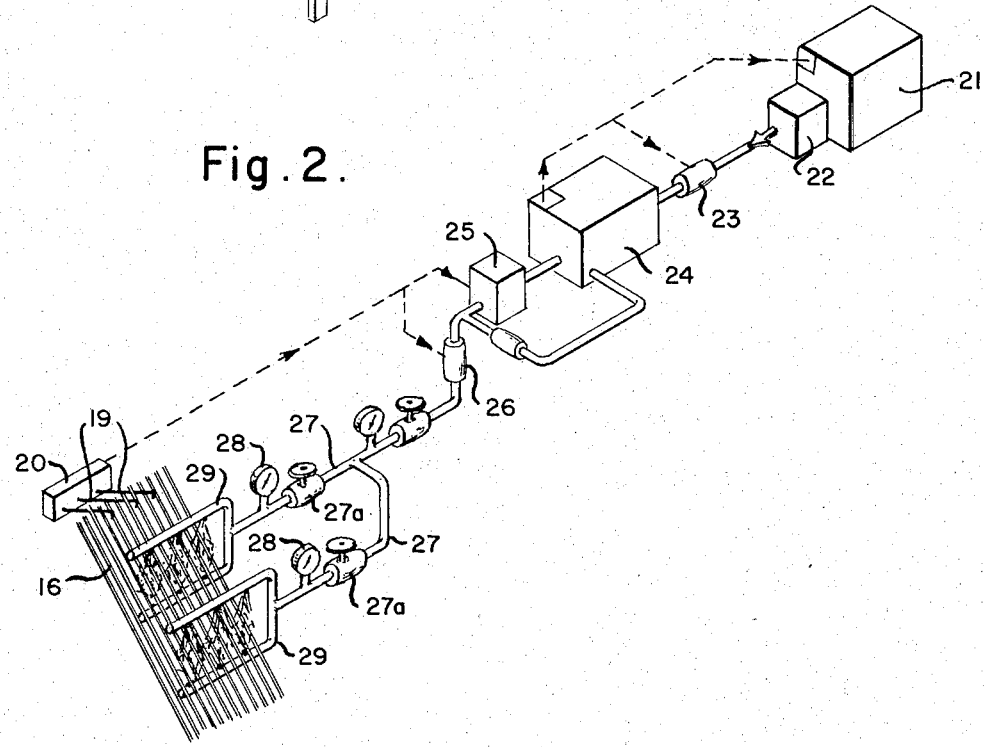
FIG. 2 is a generally schematic illustration of the treating agent spray system of FIG. 1.

Referring to the drawings we have illustrated a frame and housing 10 carrying a cylindrical drum 11 having an input end 11a and a discharge end 11b mounted in the frame for rotation about a generally horizontal axis. The inclination of the axis of drum 11 can be varied by inclination screw 12 which raises and lowers yoke 13 carrying support rollers 14 at the discharge end 11b of the drum. The drum 11 is provided on its inner periphery with spaced longitudinal baffles 15 extending from one end to the other and with discharge scoops 15a adjacent the discharge end.

An infeed chute 16 is provided at the input end of the drum 11a. The chute 16 is preferably formed of spaced steel rods or wires to form a perforate member. Fish fillets 17 or other seafood products to be treated are discharged from a feed conveyor 18 onto the infeed chute 16. Feeler members 19 connected to a switch 20 extend above the surface of the infeed chute adjacent the entry end to sense the presence of product to be treated.

Treating solution is prepared in a tank 21 equipped with an agitator 21a and pumped by pump 22 through solenoid valve 23 to supply tank 24 equipped with a level sensing device (not shown) which operates the solenoid valve 23 to maintain a supply of treating agent. A pump 25 receives treating agent from supply tank 24 and delivers it through solenoid valve 26, and lines 27 having pressure gauges 28 and manual valves 27a to bifurcated mist sprayers 29, which have one arm above and one below the perforate infeed chute so as to spray both sides of product entering on the chute.

A perforate outfeed chute 30, preferably of the same form as the infeed chute, extends into the discharge end 11b of the drum and receives the treated product from the discharge scoops 15a. The outfeed chute 30 carries the product to an outfeed conveyor 31 or other mechanism for removing the treated product to a packing area.

The operation of the machine is as follows: The product, such as fish fillets, is delivered on conveyor 18 to infeed chute 16. When the product falls onto chute 16 it contacts sensing members 19 which act on switch 20 opening valve 26 and actuating pump 25 which feeds treating agent through mist sprayers 29 against both sides of the product. The amount and rate of feed may be adjusted by valves 27a so that the relative amounts of spray at each of the mist sprayers may be regulated. The product with any excess treating agent is then discharged from chute 16 into the interior of drum 11 which is rotating and which acts with slightly pitched baffles 15 to move the product through the drum. The product moves over the baffles 15 which cause it to flex allowing deep penetration of the treating agent into the product as well as pick up of additional treating agent as may be needed from the excess which enters with the product and which acts as a surface lubricant for the interior of the drum. The product moves through the drum to the discharge scoops 15a which collect the product and discharge it onto outfeed chute from which it goes to conveyor 31. An excess solution at the discharge end of drum 11 is periodically discharged through opening 35 to drain.

While we have illustrated and described certain preferred practices and embodiments of our invention in the foregoing specification it will be understood that this invention may be otherwise embodied within the scope of the following claims.

We claim:

1. A seafood processing method comprising the steps of:

a. applying a coating of treating agent to the surface of said seafood by spraying, and
b. flexing said seafood immediately after applying said coating by passing it over a succession of moving baffles in a revolving drum, thereby causing an undulating movement in the seafood to promote the entry of said treating agent into the seafood.

2. A method as claimed in claim 1 wherein the coating of treating agent is applied under pressure.

3. A method as claimed in claim 1 wherein the coating of treating agent is applied by spraying an aqueous solution of said agent onto the surfaces.

* * * * *